Figure 1:
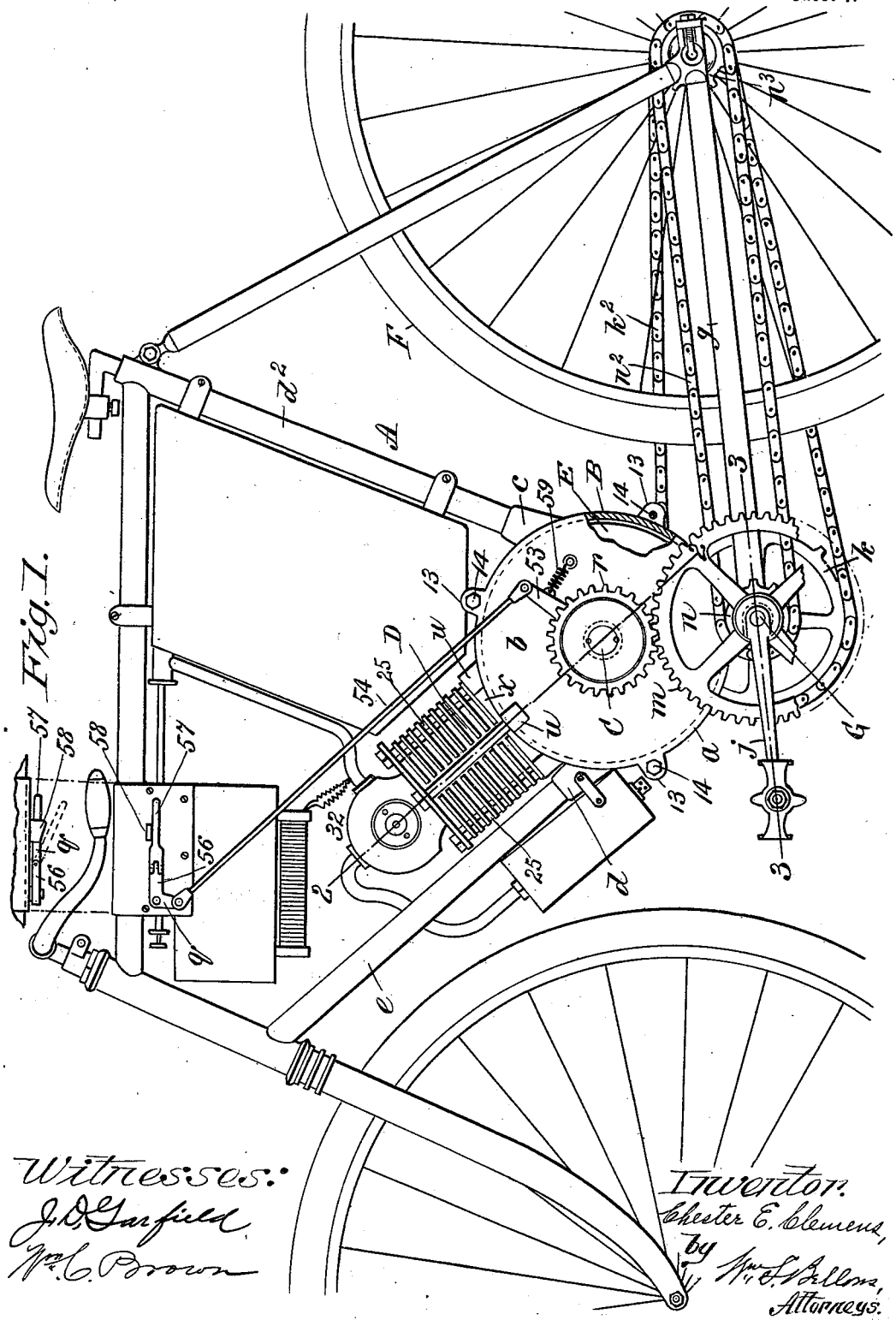

No. 667,062.  
C. E. CLEMENS.  
MOTOR CYCLE.  
(Application filed May 7, 1900.)  
Patented Jan. 29, 1901.

(No Model.)

3 Sheets—Sheet 3.

Witnesses:  
J. R. Garfield  
Wm. C. Brown

Inventor,  
Chester E. Clemens,  
by Wm. J. Bellows  
Attorney

UNITED STATES PATENT OFFICE.

CHESTER E. CLEMENS, OF SPRINGFIELD, MASSACHUSETTS, ASSIGNOR OF ONE-HALF TO WILLIAM C. BROWN, OF SAME PLACE.

MOTOR-CYCLE.

SPECIFICATION forming part of Letters Patent No. 667,062, dated January 29, 1901.

Application filed May 7, 1900. Serial No. 15,794. (No model.)

*To all whom it may concern:*

Be it known that I, CHESTER E. CLEMENS, a citizen of the United States of America, and a resident of Springfield, in the county of Hampden and State of Massachusetts, have invented certain new and useful Improvements in Motor-Cycles, of which the following is a full, clear, and exact description.

The present invention relates to improvements in the construction of motor-cycles, more particularly motor-bicycles and other vehicles in which the frame construction follows the usual lines of the present styles of bicycle-frames.

While, as well known, the application of a motor on a bicycle for the propulsion of the same is not new, the general plan has been with a view to attaching motors to existing forms of bicycles by mounting them over the rear or over the front wheel upon a supplemental frame by attaching them to the front or rear forks or by strapping them within the lines of the main frame. These methods are open to several objections, the principal one being that the attachments are not permanent and are liable to become loose by vibration, allowing the motor to shift its position, in some cases without warning, and resulting in serious accidents. Again, motors mounted above the front or rear wheels or attached to the front or rear forks are unsightly in appearance, and from their height above the ground and also because of the constant vibration make the bicycle unevenly balanced and difficult to steer. Transmission of the motor-power has usually been accomplished by the use of a belt or chain running directly from the motor to the driven wheel of the bicycle, making it necessary to use an extremely-large driving sprocket or pulley on the rear hub, and no means has usually been provided for disconnecting the motor from the driving-wheel except by removing the belt or chain. The aforementioned objections I overcome in my invention by building the case for the fly-wheel of the motor integrally with or as a fixture of the frame by transmitting the motor-power by means of an idler-wheel running upon the pedal-crank axle of the bicycle, which idler is in driving connection with the bicycle-wheel to be driven, and by providing a clutch to connect and disconnect the motor at pleasure with and from said idler-wheel.

The invention furthermore consists in combinations and arrangements of parts and in constructions of certain parts and appliances, all substantially as hereinafter fully described, and set forth in the claims.

Reference is to be had to the accompanying drawings, in which—

Figure 2:
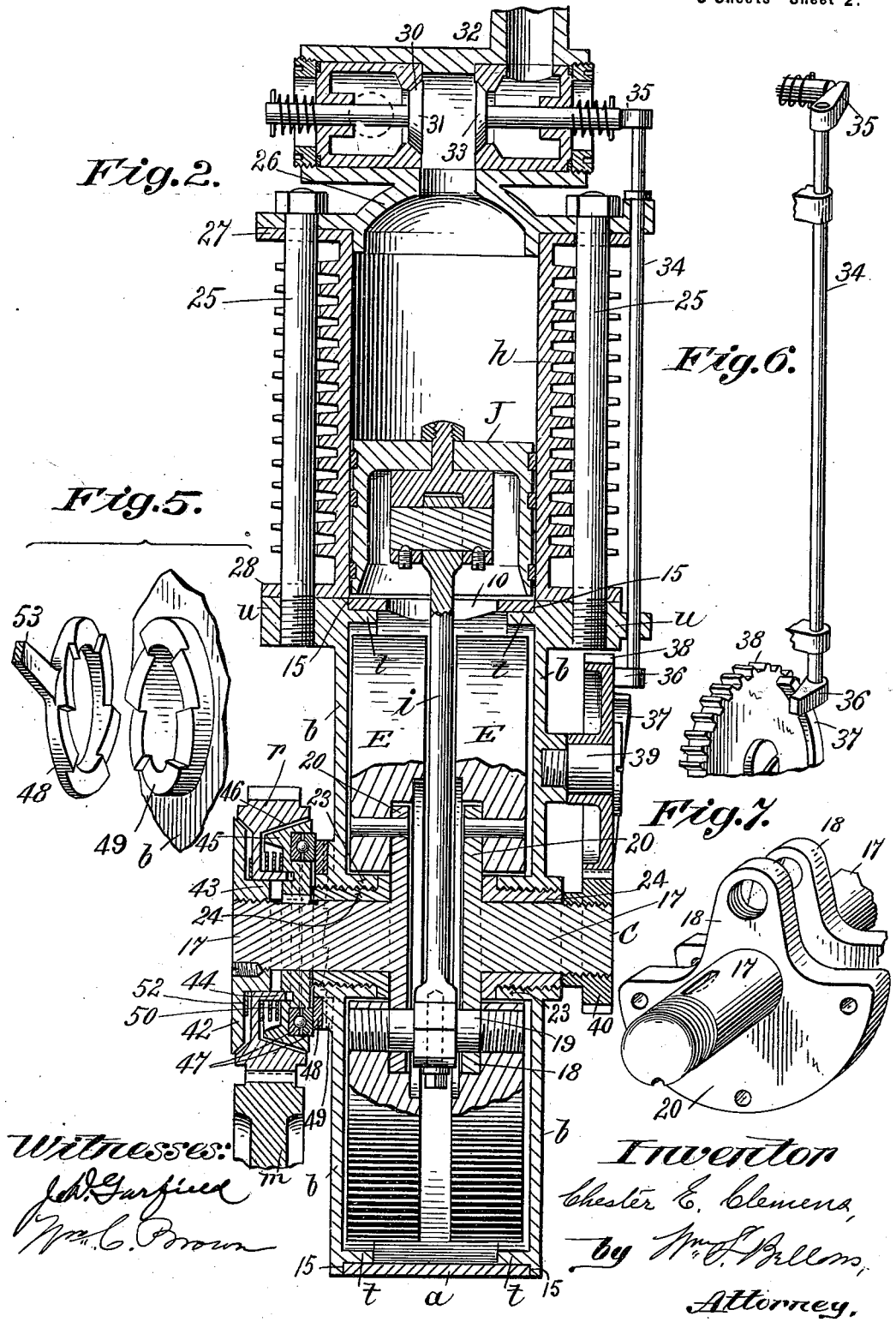
Figure 3:
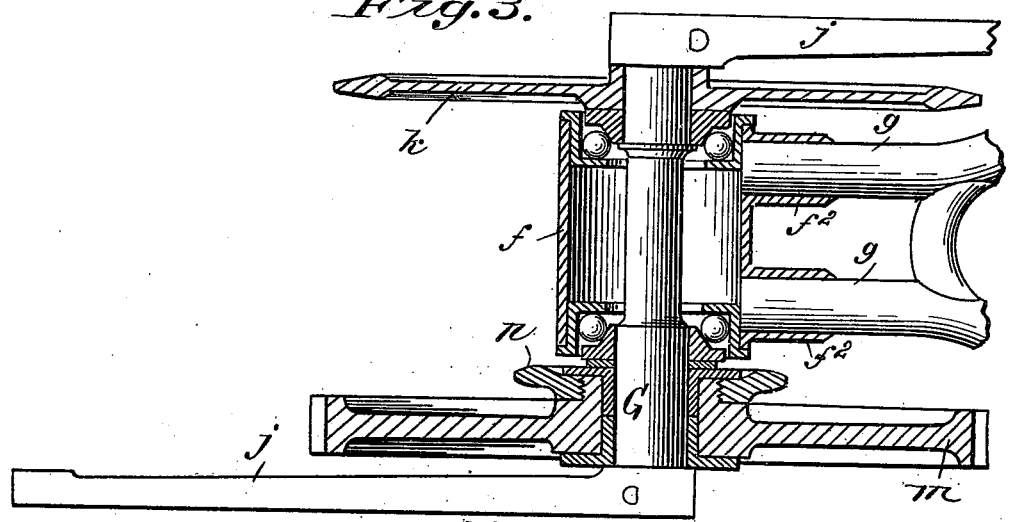
Figure 4:
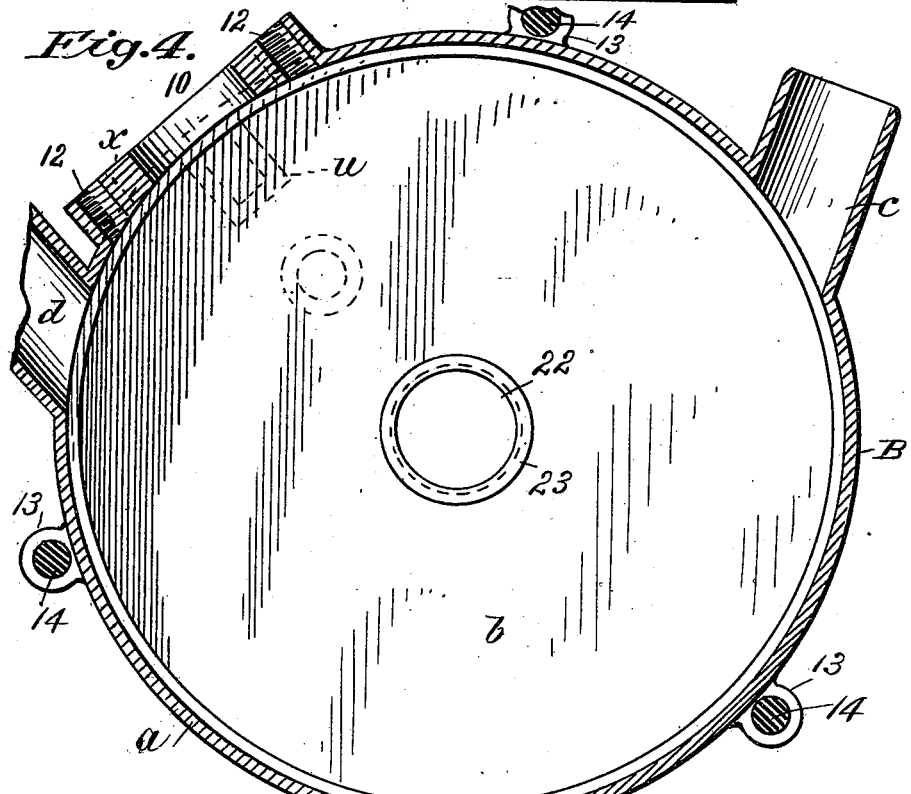

Figure 1 is a side elevation of the improved motor-cycle. Fig. 2 is substantially a sectional view longitudinally and centrally through the motor, the motor-shaft and fly-wheel, and through the portion of the bicycle-frame structure which constitutes the casing for the divided fly-wheel of the motor as taken on line 2 2, Fig. 1. Fig. 3 is a horizontal sectional view as taken on the pedal-shaft and its hanger or bracket and through the wheels mounted on the pedal-shaft. Fig. 4 is a vertical sectional view as taken through the part of the frame which constitutes the support for the motor-shaft and the inclosing casing for the fly-wheel. Fig. 5 is a perspective view illustrating portions of the clutch, hereinafter more particularly referred to. Fig. 6 is a perspective view showing the exhaust-valve-operating device. Fig. 7 is a perspective view of divided and counterbalanced parts of the motor crank-shaft.

In the drawings, A represents the framing of the bicycle, having as a permanent part of its construction the casing B, which constitutes the support for the bearings of the crank-shaft C of the motor and also materially the support for the motor, which is generally indicated by the letter D. The said casing B comprises a ring-like or annular body $a$, having end plates or heads $b\ b$ combined therewith, as hereinafter pointed out. The said annular part of the casing $a$ is constructed with the socket-lugs $c$ and $d$ for receiving connection therewith of the upright seat-supporting member $d^2$ of the frame and the forwardly upwardly-extending frame member $e$. The said annular body $a$ is also formed with the depending hanger or pedal-shaft bracket $f$, which is preferably integrally formed therewith, although it might be separately constructed and affixed thereto. The said depending bracket $f$ has the rearwardly-extending socket-lugs $f^2 f^2$ receiving the connection therein by brazing or otherwise, as usual. The forward portions $g\ g$ of the rear fork or bottom framing of the machine and the opposite circular side plates $b\ b$ of the casing B have internally-extending annular flanges $t\ t$, which fit and have bearing within the marginal portions of the ring-like part $a$, and at the upper forward portions of said plates $b$ they are constructed with the laterally-extending lugs $u$ integrally cast thereon. The ring portion $a$ has its forward upward portion widened or thickened, as indicated at $x$, through which thickened portion are the hole 10 and the screw-top sockets 12 12. The circular side plates or cheeks $b\ b$ are constructed with the short radially-extending ears or lugs 13 13, through which connecting-bolts, secured by nuts, are engaged, as indicated at 14, for holding the said cheek-plates firmly against the opposite ends or edges of the annular part of the casing, the shoulders 15, which are formed next outside of the internal annular flanges $t\ t$, enabling the said casing-sections to be assembled with all due closeness and stability.

The crank-shaft of the motor C is formed in the two halves or sections 17 17, as shown in Figs. 2 and 7, 18 18 being the cranks with which are screw-united the wrist or crank pin 19.

20 20 are counterpoises or weighted extensions integral with and opposite the crank members 18.

E E represent the two disks or sections which constitute the divided fly or balance wheel, the same having central openings through them to leave clear space axially therewithin for the motor-shaft and its supports or journals. The fly-wheel disks are secured to the parts 18 and 20, comprised in the counterpoised cranks, so that they necessarily rotate with the crank-shaft. The central opening 22 through the opposite side cheek-plates of the casing B has provided thereat the annular hollow hub 23, receiving by right and left hand screw-threaded engagements the bushings 24, which constitute the bearings for the opposite extremities of the motor-shaft C.

$h$ represents the cylinder for the motor, which is herein indicated as being a gasolene-motor, and said cylinder has its position obliquely arranged against, above, and forward of the said casing B, being secured thereto by the long bolts 25, which pass through the flanged head 26 of the cylinder, the upper and lower flanges 27 and 28 of the cylinder, and into the lugs $u\ u$ and $x$ of the casing, the said bolts having screw-threaded engagements each at its one end and having a confining-nut at its other end. The pitman-rod $i$, which connects the piston $j$ with the crank-pin 19, has freely its endwise and swinging movements through the aforementioned aperture 10 in the upper forward casing B. On the head 26 are equipped the gas-inlet and gas-exhaust portions 30 and 32, having the valves 31 and 33, the inward valve being held close by the light spring, as usual, its opening being accomplished by the suctions within the engine, as usual, while the exhaust-valve, which is spring-closed, is mechanically opened by the rocking movement of the shaft 34, on the upper end of which is the lever-arm 35 in proximity to the stem of the said valve 33. On the lower end of the said shaft 34 is another lever arrangement 36, coacting with which is a cam 37 on the gear-wheel 38, which is mounted on a journal-stud 39, applied on and supported by one of the cheek-plates $b$, said gear-wheel 38 being in mesh with a pinion 40 of half its diameter, which is on an outer portion of one of the motor-shaft sections 17.

The pedal-shaft G, mounted in the pedal-shaft bracket $f$ aforementioned, and which pedal-shaft is equipped, as usual, with bicycles with the cranks $j\ j$, has thereon a sprocket-wheel $k$, around which runs the sprocket-chain $k^2$, which works around the sprocket-wheel on the hub of the rear wheel F of the bicycle, it being understood that this sprocket-wheel around which the chain $k^2$ runs is engaged with the hub through the medium of what is known as a "free clutch," so that when the pedals are driven by the feet the rear wheel will be positively thereby driven, but so that when the bicycle is run by the motor-power the feet may remain on the pedals, which will not be turned through the sprocket connections $k\ k^2$. This free-clutch arrangement is not in itself a new equipment on a bicycle. On the opposite end of the pedal-shaft G and at the opposite side of the bicycle from the sprocket $k$ are loosely mounted spur gear-wheel $m$ and sprocket-wheel $n$, both being united to turn in unison. Around the said sprocket-wheel $n$ a sprocket-chain $n^2$ runs, which also runs around a sprocket-wheel $n^3$, which is secured to the hub of the rear bicycle-wheel F. Meshing with the said spur gear-wheel $m$, which is loose on the pedal-shaft G, is a spur gear-wheel $r$, which is mounted about the extremity of one of the motor-shaft sections 17, and this gear may be clutch-engaged with the said motor-shaft or be left free relatively thereto, accordingly as it is desired that the gear-wheel $m$ on the pedal-shaft shall be power-driven or not. The clutching devices and operating appliances therefor as constructed in this mechanism will be now pointed out.

Affixed on the outer end of the motor-shaft section 17 is the circular flanged part 42 on the inwardly-turned hub 43, on which the hub 44 of the said gear-wheel $r$ is fitted for rotation. On the opposite side of the web or body of the said spur-gear $r$ from the flanged part 42 is the annular clutch member 45, the same being keyed to the crank-shaft, and the outer periphery thereof is beveled, as is also the internal periphery of the hollowed-out part 46 of the gear-wheel $r$. The clutch member 45, fixed to rotate in unison with the motor-shaft, is splined on said shaft and may have an axial movement along the same. Within the face of the said clutch member 45 is a groove, in which is set a pair of hardened-steel rings 47 47, one of which may be regarded as a fixture of the part 45, while the other may turn relatively thereto, but without wear by reason of the balls interposed in the groove or raceway constructed between the two rings.

Adjacent the external wear-ring 47 is the cam-faced ring 48, adapted to have a partial turning movement on the outer extension of the central annular hub 23 of the cheek-plate $b$, and constructed on the outer side of the said adjacent cheek-plate of the casing B is a circularly-arranged series of cam-faces 49. Between the clutch member 45 and the central web of the gear-wheel $r$ is a spring 50, the tendency of which is to insure normally a separation of the clutch parts 45° and 46. Also between the central web of the gear-wheel $r$ and the flange 42 is a spring 52, also having the tendency to throw the gear-wheel slightly away from said flange. The partially-rotatable clutch-operating cam-ring 48 has the lever extension 53, to which a connecting-rod 54 is secured, said rod extending forwardly and upwardly and has connection with the angular lever $q$, pivotally supported by the bicycle-frame near the head. The handle-arm 56 of said lever is formed with the pivotally-joined section 57, whereby such handle may be swung laterally, while the rest of the lever remains stationary to disengage such handle from beneath the fixed lug or stop 58. So, to free the clutch after the same has been set by placing handle-section 57 under the stop, whereby the motor will be disengaged from its driving connection with the bicycle, the rider first swings the lever-handle laterally, and then the whole lever is swung upwardly by the retracting-spring 59. The said retracting-spring 59 serves when permitted to react to turn the cam-ring 48 in the direction so that its cam-surfaces settle into those 49 and free the clutch. The setting and resetting of the clutch are performed by swinging lever-handle 57 downwardly and inwardly under the stop 58.

It will be understood at the time of starting the motor that the bicycle will be driven through means of the pedals and sprocket connections $k$ $k$, &c., and the running of the bicycle, occasioned through such means, will by the sprocket connections $n^3$ $n^2$ $n$ and gears $m$ $r$ cause the turning of the motor-shaft until the starting conditions have been established for a sufficient time for the motor to become the driving power.

Having thus described my invention, what I claim, and desire to secure by Letters Patent, is—

1. In a motor-cycle the combination with a pedal-shaft provided with suitable cranks, and having supporting-bearings therefor, of an idler-wheel running free on said pedal-shaft, driving connections between said idler and the wheel of the vehicle to be driven, a motor mounted on the cycle, and having its driving-shaft detachably connected with said idler-wheel, for the purpose set forth.

2. In a motor-bicycle or like vehicle in combination, the frame having at lower portion thereof a casing constituting a part thereof, a motor supported by said casing and having its shaft journaled through same, and its fly-wheel inclosed therewithin, a gear-wheel mounted on the motor-shaft, a clutch for connecting and disconnecting the said gear-wheel and motor-shaft, a pedal-shaft having cranks and a gear-wheel loosely mounted thereon, which runs in engagement with said first-named gear-wheel, and a medium of transmission between the pedal-shaft gear and the wheel of the vehicle to be driven.

3. In a motor-bicycle or like vehicle, in combination, a frame having at a lower portion thereof a casing constituting a part thereof, a motor supported by said casing and having its shaft journaled through same and its fly-wheel inclosed therewithin, a gear-wheel mounted on the motor-shaft, clutch mechanism for connecting and disconnecting said motor-shaft and said gear-wheel, a pedal-shaft hanger or bracket provided as a depending extension of the said casing having a pedal-shaft mounted therein and provided with a gear-wheel mounted freely thereon, and mechanism of driving connection between the said free gear-wheel and the wheel of the bicycle to be driven, substantially as described.

4. In a motor-bicycle, or the like, the frame thereof constructed with a lower portion thereof with a casing, a motor supported by said casing and having its shaft journaled through the same, and its fly-wheel inclosed therewithin, the gear-wheel mounted on the motor-shaft and mechanism for clutching and unclutching said gear-wheel to and from said shaft, a pedal-shaft hanger formed as an integral depending portion of said casing and having mounted to freely rotate thereon a combined gear-wheel in mesh with the motor-shaft gear, and a sprocket-wheel, a sprocket-wheel on the wheel of the vehicle which is to be driven and a chain running around the two sprocket-wheels, for the purpose set forth.

5. In a motor-cycle the combination with the casing constructed as a part of the frame of the vehicle and having a crank-shaft journaled therethrough with a fly-wheel on the shaft inclosed in said casing the motor for driving said shaft, supported externally of said casing, a pedal-shaft mounted in bearings which are provided below said casing having thereon a fixed sprocket-wheel at one side of the vehicle and at the other side loosely thereon the combined gear-wheel $m$ and sprocket-wheel $n$, two sprocket-wheels on the rear wheel of the bicycle and chains running around the opposite paths of sprocket-wheels, a gear-wheel normally loose on the motor crank-shaft in mesh with the said gear-wheel on the pedal-shaft, and means for placing said gear-wheel in and out of connection with the motor crank-shaft, substantially as described.

6. In a motor-cycle in combination the casing B comprising the annular intermediate section $a$ constructed with the opening 10, and the lug $x$, and with which members of the cycle-frame are permanently united, and the cheek-plates confined at opposite sides of the annular section the same having the lugs $u$, the motor-cylinder mounted against the edge of the said section, and having the confining rods or bolts passed from its head end into connection with said lugs $u$ and $x$, the motor crank-shaft journaled through said casing and driving mechanism and interposed clutching and unclutching mechanism between said motor-shaft and a wheel of the vehicle.

7. In a motor-cycle, the frame having constructed as a part thereof the casing B provided with the opposite side plates or cheeks having journal-bearings in which are mounted shaft-sections 17, 17, having crank members 18, 18, a wrist or crank pin uniting said shaft-sections, fly-wheel disks E, E, secured to said cranked members of the shaft-sections, a gear-wheel and a clutch for connecting and disconnecting it with and from the crank-shaft, a pedal-shaft having a gear-wheel free thereon, and driving connections between the latter gear and the vehicle-wheel to be driven.

8. The casing B having the motor-shaft journaled therein and having the cam 49, the gear-wheel $r$ loosely rotatable relatively to the crank-shaft, and constructed to constitute a clutch member, a coacting clutch member rotatable but axially movable relatively to the said crank-shaft, a cam-faced part interposed between the clutch member and the cam 49, and means for imparting a clutch-operating movement thereto, a pedal-shaft, a gear-wheel mounted as an idler thereon on said pedal-shaft, and in mesh with the gear-wheel $r$ and connections for driving between the last-named gear and the vehicle-wheel to be driven.

9. The casing B having the motor-shaft journaled therein and having the cam 49, the flange 42 on the crank-shaft, the gear-wheel $r$ loosely rotatable relatively to the crank-shaft and also axially movable, and constructed to constitute a clutch member, a coacting clutch member rotatable but axially movable relatively to the said crank-shaft, a cam-faced part interposed between the clutch member and the cam 49, and means for imparting a clutch-operating movement thereto, the spring 52 between the flange 42 and the gear $r$ and the spring between the said gear and the cam-faced part 49, a pedal-shaft, a gear-wheel mounted as an idler thereon on said pedal-shaft and in mesh with the gear-wheel $r$ and connections for driving between the last-named gear and the vehicle-wheel to be driven.

10. In a motor-cycle, in combination with the frame having the case B constructed as a rigid permanent part thereof, and having the motor mounted externally thereon and the motor-shaft journaled in and through said casing with its fly-wheel inclosed therewithin and provided with a pedal-shaft having a gear $r$ loose thereon which is in driving connection with the driven wheel of the vehicle, the gear-wheel loose on the motor crank-shaft, a clutch member rotatable with the motor-shaft adapted to engage said gear $r$, a swinging clutch operating cam-formed part 48 having a lever extension, a lever $q$ mounted at a convenient position on the vehicle-frame and having one arm thereof constructed with the pivotally-jointed handle 57, the lug or stop 58, and the retracting-spring, substantially as described.

Signed by me at Springfield, Massachusetts, in presence of two subscribing witnesses.

CHESTER E. CLEMENS.

Witnesses:
WILLIAM C. BROWN,
WM. S. BELLOWS.